US008128817B2

(12) United States Patent
Roesgen

(10) Patent No.: US 8,128,817 B2
(45) Date of Patent: Mar. 6, 2012

(54) LIQUID FILTER SUITABLE FOR MOTOR VEHICLES

(75) Inventor: Andre Roesgen, Remshalden (DE)

(73) Assignee: Mann + Hummel GmbH, Ludwigsburg (DE)

( * ) Notice: Subject to any disclaimer, the term of this patent is extended or adjusted under 35 U.S.C. 154(b) by 1020 days.

(21) Appl. No.: 11/798,769

(22) Filed: May 16, 2007

(65) Prior Publication Data

US 2008/0047891 A1 Feb. 28, 2008

Related U.S. Application Data

(63) Continuation of application No. PCT/ EP2007/051631, filed on Feb. 21, 2007.

(30) Foreign Application Priority Data

Aug. 25, 2006 (DE) .................... 20 2006 013 088 U

(51) Int. Cl.
*B01D 35/30* (2006.01)
*B01D 29/00* (2006.01)
*B01D 35/00* (2006.01)
*B01D 35/153* (2006.01)
*B01D 27/00* (2006.01)

(52) U.S. Cl. ........ 210/232; 210/234; 210/235; 210/236; 210/435; 210/440; 210/441; 210/443; 210/444; 210/454; 210/455

(58) Field of Classification Search .................. 210/234, 210/235, 236, 352, 363, 390, 418, 232, 435, 210/440, 441, 443, 444, 454, 455
See application file for complete search history.

(56) References Cited

U.S. PATENT DOCUMENTS

| 5,114,572 A | * | 5/1992 | Hunter et al. | ................. 210/120 |
| 5,548,893 A | | 8/1996 | Koelfgen | |
| 5,826,854 A | * | 10/1998 | Janvrin et al. | ............... 251/149.9 |
| 5,922,199 A | * | 7/1999 | Hodgkins | ..................... 210/256 |

(Continued)

FOREIGN PATENT DOCUMENTS

| DE | 19707132 | 8/1998 |
| DE | 19961580 | 6/2001 |
| EP | 0529782 A1 | 3/1993 |
| WO | WO0021640 | 4/2000 |
| WO | WO 2006/012031 | * 2/2006 |

OTHER PUBLICATIONS

German patent office search 20 2006 013 088.8; PCT search report PCT/EP2007/051631.

*Primary Examiner* — Benjamin Kurtz

(57) ABSTRACT

A liquid filter suitable for motor vehicles which includes a filter head (11), a vessel (12) and a filter element (16) disposed within the vessel (12) sealingly separating an inlet (14) from an outlet (15) such that liquid from the inlet must flow through the filter element to reach the outlet. The filter element (16) has guide projections (27, 28) positioning the filter element (16) within the vessel (12). Prior to installation, the filter element (16) is preassembled into the vessel (12) and fixed in position by pushing the filter element (16) into an element guide (29), after which the preassembly is screwed onto the filter head (11). When the vessel (12) is unscrewed from the filter head (11), the filter element (16) slides out of the element guide (29) and moves axially upwardly to free a volume V. Liquid flowing into the vessel (12) from the higher regions of the liquid filter (10) can flow into this volume, thus enabling drip-free replacement of the filter element.

11 Claims, 5 Drawing Sheets

U.S. PATENT DOCUMENTS

| | | |
|---|---|---|
| 6,251,273 B1 | 6/2001 | Jawurek et al. |
| 6,488,845 B1 * | 12/2002 | Neufeld et al. ............... 210/232 |
| 6,986,426 B2 * | 1/2006 | Clausen et al. ............... 210/435 |
| 7,087,166 B1 * | 8/2006 | Sudo et al. .................... 210/232 |
| 2003/0178362 A1 * | 9/2003 | Cline ............................ 210/443 |
| 2004/0149640 A1 * | 8/2004 | Hennes et al. ................ 210/232 |
| 2006/0157403 A1 * | 7/2006 | Harder et al. ................. 210/445 |
| 2008/0142426 A1 * | 6/2008 | Greco et al. .................. 210/234 |

* cited by examiner

LIQUID FILTER SUITABLE FOR MOTOR VEHICLES

CROSS REFERENCE TO RELATED APPLICATIONS

This application is a continuation of international patent application no. PCT/EP2007/051631, filed Feb. 21, 2007 designating the United States of America, the entire disclosure of which is incorporated herein by reference. Priority is claimed based on Federal Republic of Germany utility model application no. DE 20 2006 013 088.8, filed Aug. 25, 2006.

BACKGROUND OF THE INVENTION

The invention relates to a liquid filter especially suitable for use with motor vehicles.

Liquid filters comprising a filter head, a vessel screwed to the filter head, and a filter element disposed inside the vessel are known in the art. When the vessel is unscrewed from the filter head, liquid fuel oil spills over the rim of the vessel because fuel or oil from parts of the liquid circuit above the vessel flows into the vessel and causes the vessel to overflow.

SUMMARY OF THE INVENTION

It is therefore an object of the invention to provide an improved liquid filter construction.

Another object of the invention is to provide a liquid filter which minimizes or eliminates liquid spillage when the vessel is detached from the filter head.

A further object of the invention is to provide a liquid filer which enables a filter vessel to accommodate an influx of liquid when the vessel is detached from a filter head.

It is also an object of the invention to provide a liquid filter that has a simple design and can be manufactured at reasonable cost.

These and other objects are achieved in accordance with the present invention by providing a liquid filter comprising a filter head, a vessel detachably mounted on said filter head, and a filter element sealingly positioned inside the vessel separating a filter inlet from a filter outlet so that liquid from the inlet must flow through the filter element to reach the outlet, wherein the filter element is provided with guide projections which position the filter element inside the vessel, and the axial position of the filter element inside the vessel is shifted when the vessel is detached from the filter head.

The liquid filter according to the invention thus comprises a filter head, a vessel and a filter element arranged within the vessel. The filter element is disposed in such a way that it separates an inlet from an outlet in a sealed manner. Liquid filters of this kind are suitable for filtering fuel or oil, particularly for internal combustion engines in vehicles and the like. The filter element has guide projections to position the filter element within the vessel. Prior to installation, the filter element is preassembled into the vessel. To this end, the filter element is pushed into element guide and fixed in position. This preassembled unit is then screwed onto the filter head. When the vessel is unscrewed from the filter head, the filter element slides out of the element guide and moves axially upwardly, thereby freeing a volume V. Liquid that flows into the vessel from the higher regions of the liquid filter can flow into this volume. Thus the filter can be replaced without dripping. To make it easier for the liquid to flow out of the higher regions, closeable ventilation holes may be provided, which are opened prior to unscrewing the filter so as to allow air to flow into this higher region. This prevents a negative pressure from forming within the filter.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
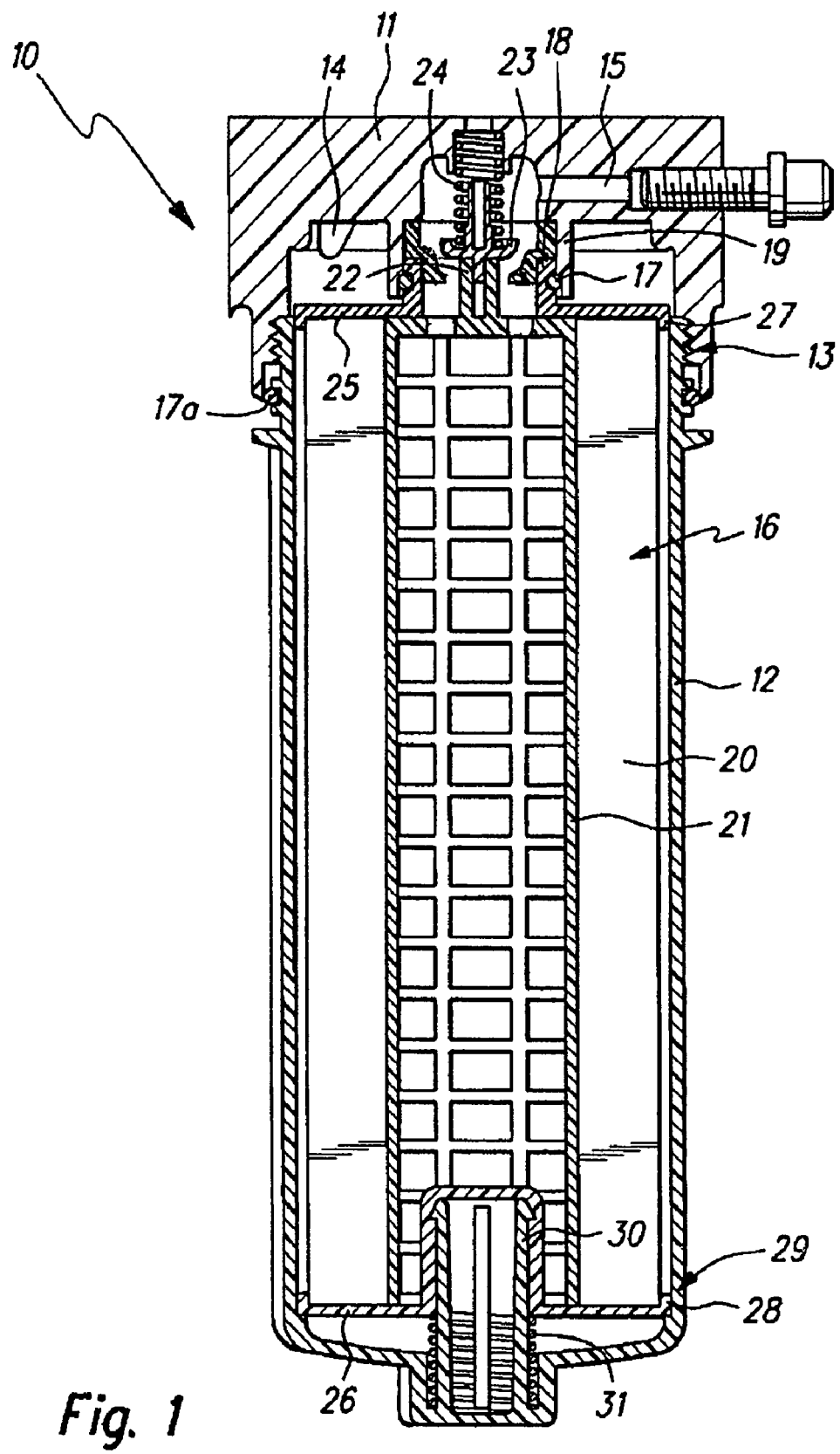
FIG. 1 is a sectional view of a liquid filter constructed in accordance with the present invention.

FIG. 1 is a sectional view of a liquid filter 10. The liquid filter 10 has a filter head 11 and a vessel 12. The vessel 12 can be connected to the filter head 11 via a threaded joint 13 using an O-ring 17a to form a tight seal. As an alternative, other kinds of connections may be used, e.g., a bayonet joint. Inlets and outlets 14, 15 for the liquid to be filtered and the filtered liquid, for example fuel or oil, are provided within the filter head 11. In other embodiments, these inlets and outlets 14, 15 may also be arranged on the vessel 12. The inlet 14 is separated from the outlet 15 by a filter element 16 so as to form a seal. An O-ring 17 is provided to seal the filter element 16 on the filter head 11. This O-ring 17 is mounted to a seal shoulder 18 of the filter element 16 and is compressed when the filter element 16 is mounted to a fitting 19 of the filter head 11.

The filter element 16 has an annularly closed filter medium 20 and a support tube 21 arranged within the filter medium 20. This support tube has a lattice structure which allows the liquid to flow through it without appreciable pressure loss. The support tube 21 has a concentrically disposed pin geometry 22, which opens a valve 23 when the filter element 16 is inserted correctly enabling the liquid to flow out of the filter arrangement. The valve 23 is spring loaded by a coil spring 24, so that the valve 23 is closed when no filter element 16 is installed or when the filter element is installed incorrectly. The valve 23 is also closed when the filter element is replaced.

The filter element 16 further has an upper end disk 25 and a lower end disk 26. The end disks 25, 26 are connected to the filter medium 20 so as to form a seal. This connection can, for example, be produced by adhesive bonding, welding or in some other manner. The seal shoulder 18 is disposed on the upper end disk 25. The upper end disk 25 also has a plurality of outwardly protruding guide projections 27 distributed around its circumference, which position the filter element 16 during axial movement within the vessel 12.

The lower end disk 26 also has a plurality of guide projections 28 distributed around its periphery. These guide projections 28 fix the filter element 16 within the vessel 12. To this end, the vessel 12 has axial and radial element guide 29, which will be described in greater detail below with reference to FIG. 5.

In its bottom area, the vessel 12 has axially extending detent hooks 30 enclosed by a spring 31. The spring 31 communicates with the lower end disk 26. In the preassembled state of the filter element 16 within the vessel 12, the filter element 16 is axially fixed inside the vessel 12 by the lower guide projections 28, thereby compressing the spring 31. When the vessel 12 is unscrewed from the filter head 11, the O-ring 17 radially fixes the filter element 16 on the fitting 19, such that no analogous radial movement of the filter element 16 together with the vessel 12 occurs.

By rotating the vessel 12 by e.g., 5 to 10°, the guide projections 28 can therefore disengage from the element guide 29. In other embodiments a rotation of up to approximately 45° may be required for the guide projections 28 to disengage from the element guide 29. The spring force of the spring 31 pushes the filter element upwardly by approximately 2 to 3 cm. Depending on the overall size of the liquid filter, the filter element 16 may have to travel a greater axial distance in large-volume liquid filters or a smaller distance in very small liquid filters. The lower end disk 26 can rebound up to the detent hooks 30.

The detent hooks 30 prevent any further axial movement of the filter element 16 so that during removal the filter element 16 cannot remain on the fitting 19 of the filter head 11 but is removed together with the vessel 12. This axial rebound of the filter element 16 from its fixed position frees a volume in the vessel 12 into which fuel can flow. This free volume can therefore receive incoming liquids so as to prevent any overflow of the vessel 12. This geometric configuration of the components enables a clean replacement of the filter element.

Figure 2:
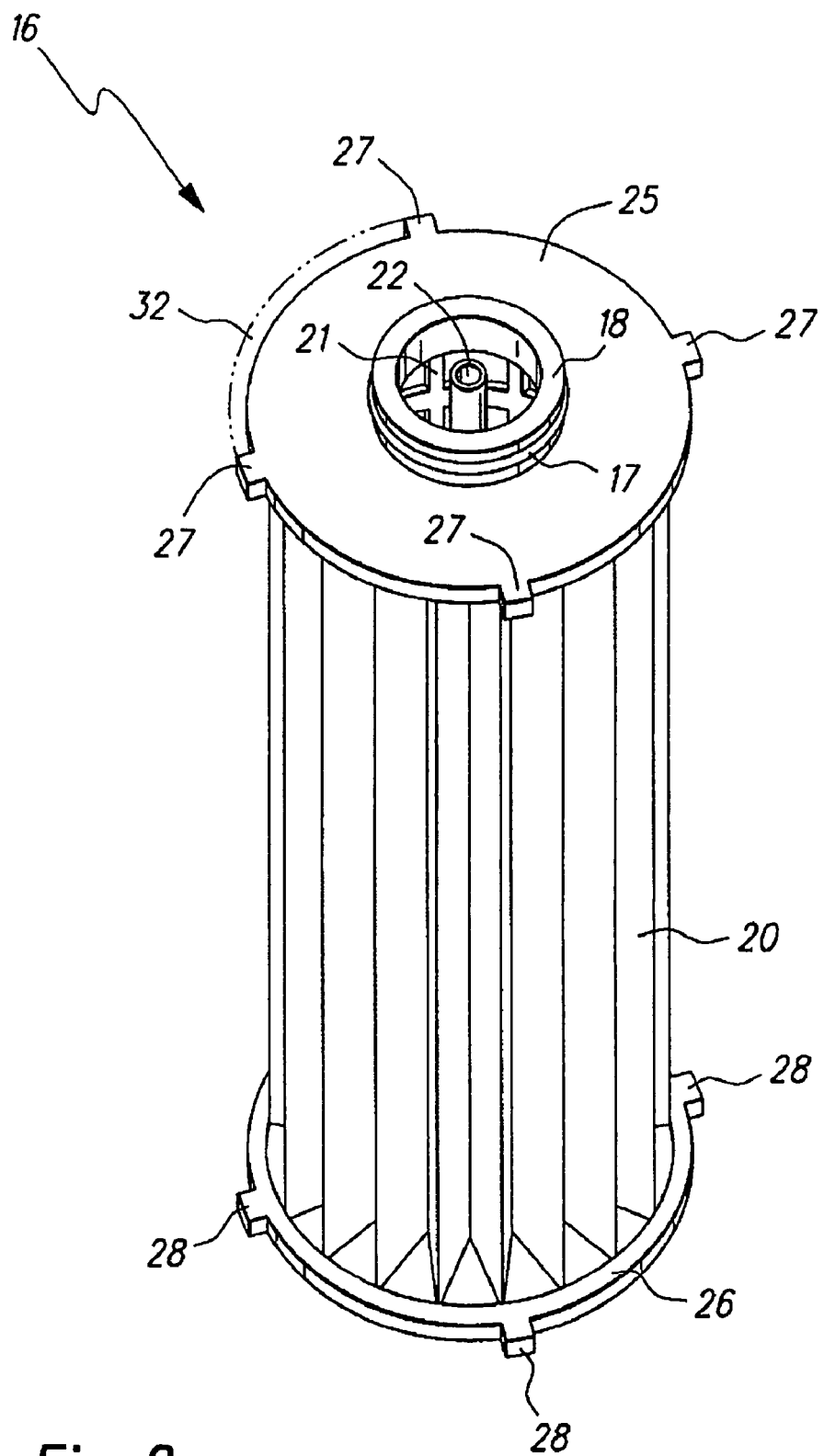
FIG. 2 is a perspective view of the filter element of FIG. 1.

FIG. 2 is a perspective view of a filter element 16. Components corresponding to those of FIG. 1 are identified by the same reference numerals. The filter element 16 has four guide projections 27 distributed uniformly around the circumference of the upper end disk 25. The number of guide projections 27 is arbitrary, but three to five guide projections 27 are preferred. Preferably, the guide projections 27 are uniformly distributed along the periphery of the end disk. The guide projections 27 extend from the periphery of the end disk 25 in such a way that a gap 32 is formed between the guide projections 27 in relation to the geometry of the vessel 12 (indicated by the broken line). The liquid can flow through this gap 32. The guide projections 27 contact the geometry of the vessel 12 so that wedging of the filter element 16 is prevented.

Figure 3:
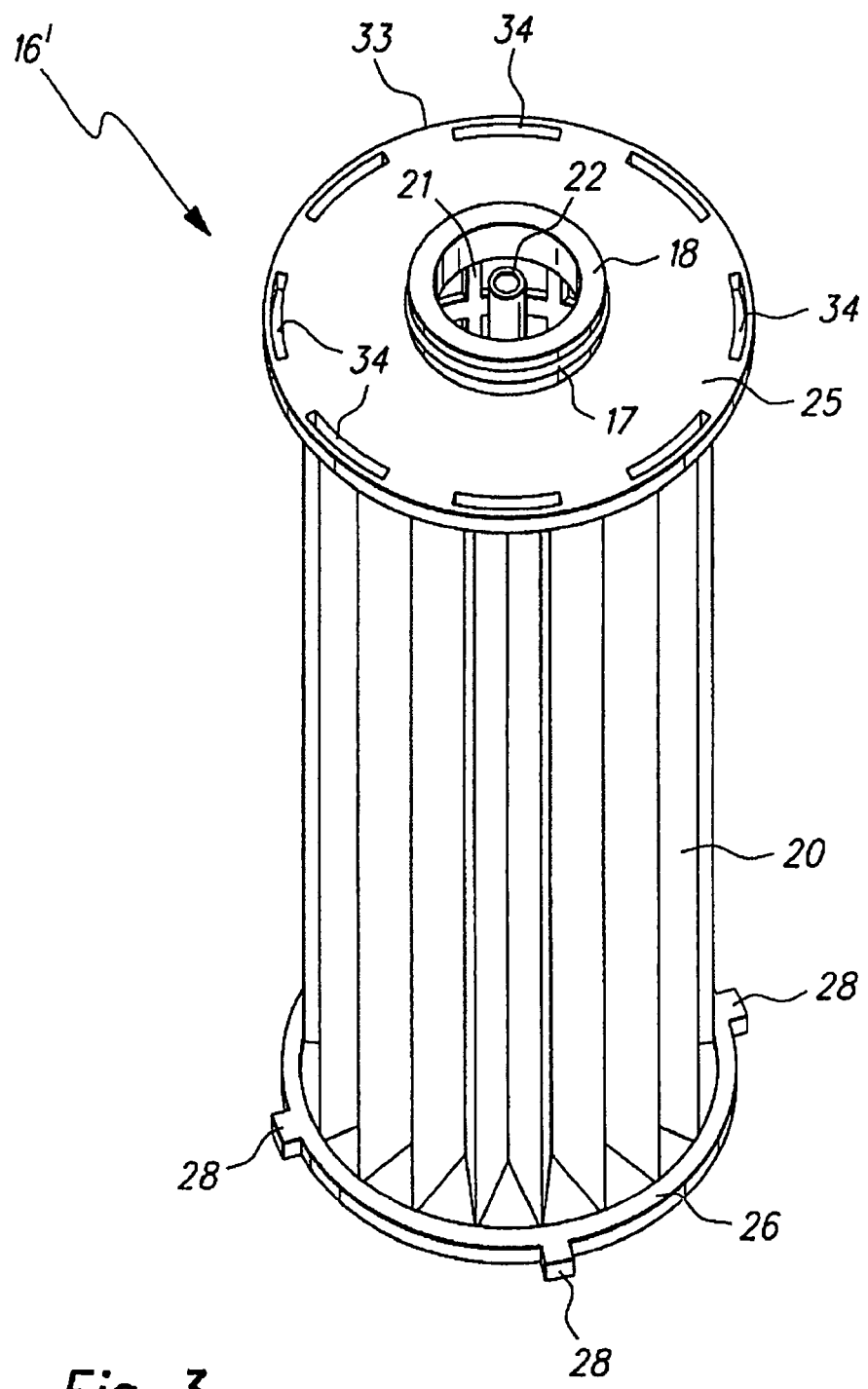
FIG. 3 is a perspective view of an alternative filter element embodiment in accordance with the present invention.

FIG. 3 shows an alternative filter element 16'. Components corresponding to those of FIG. 2 are again identified by the same reference numerals. In contrast to FIG. 2, the guide projections 27 form a peripheral margin 33, with elongated slots 34 provided to allow the liquid to flow through. Thus, the filter element 16 conforms to the vessel geometry over the entire periphery, such that an adequate flow cross-section is provided for the liquid.

Figure 4:
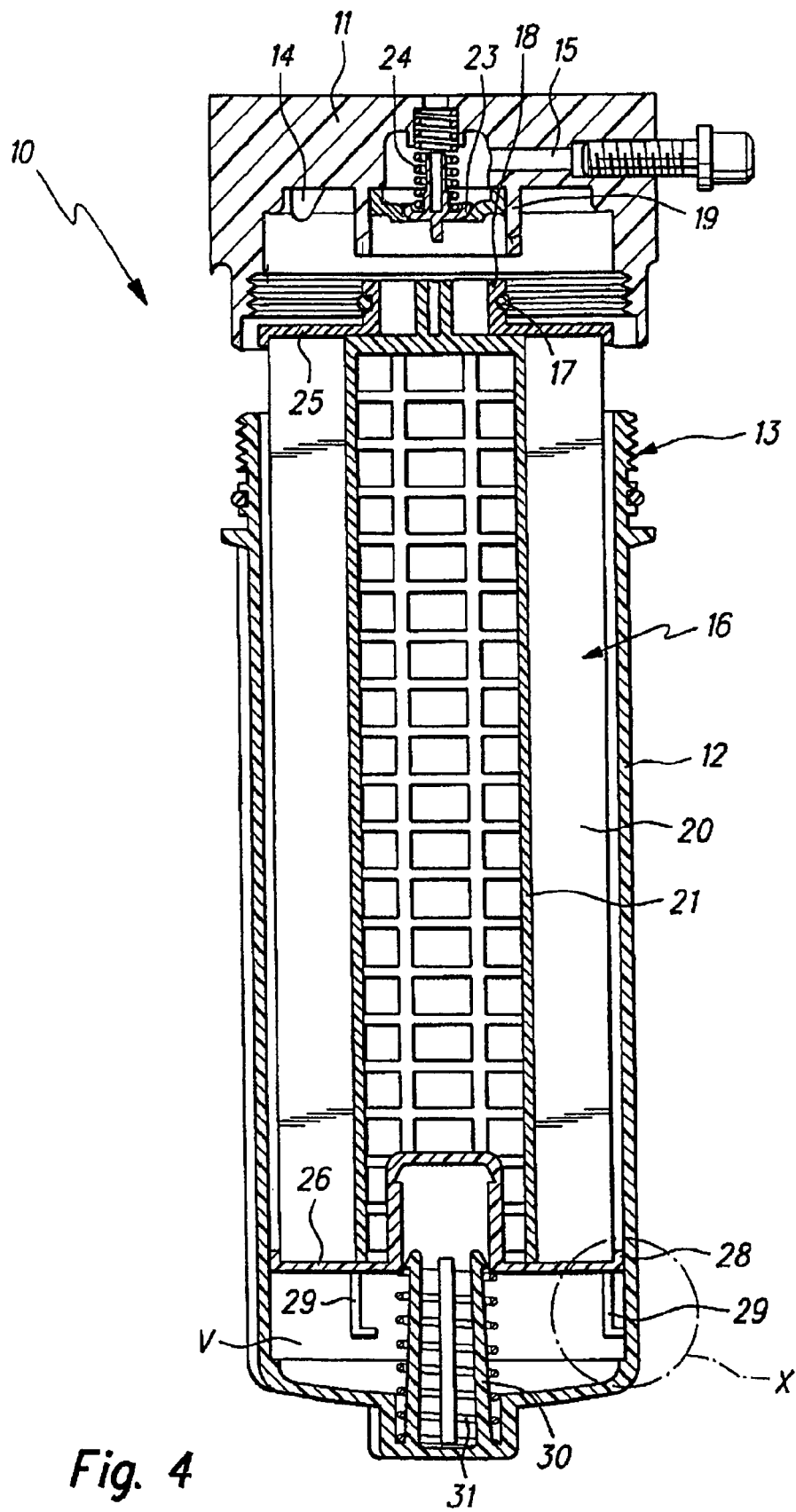
FIG. 4 depicts the liquid filter of FIG. 1 a partially detached state.

FIG. 4 shows the liquid filter depicted in FIG. 1 in a partially disassembled state. Components corresponding to those of FIG. 1 are identified by the same reference numerals. The threaded joint 13 between the filter head 11 and the vessel 12 is shown in the unscrewed state. The filter element 16 is disengaged from the element guide 29 and has been pushed upwardly by the spring 31 so as to free a volume V in the lower vessel region.

Because the filter element 16 has been displaced in axially downward direction, the pin geometry 22 no longer contacts the valve 23. The spring 24 presses the valve 23 against the valve seat, so that the valve 23 is closed and the outlet 15 can no longer communicate with the environment. Only when a correct filter element 16 is inserted and mounted is the valve 23 lifted from its valve seat so that the interior of the filter 10 can again communicate with the outlet 15.

Figure 5:
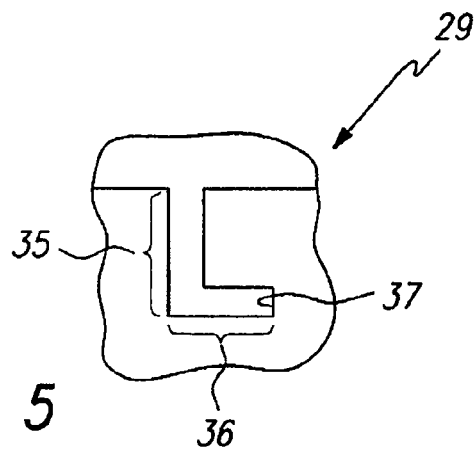
FIG. 5 is a detail view of the filter element guide of the vessel.

FIG. 5 shows a detail of the element guide 29 of the vessel 12. The element guide 29 has an axial region 35 and a horizontal region 36. These geometries 35, 36 protrude into the interior of the vessel 12. To preassemble the filter element 16 in the vessel 12, the guide projections 28 are inserted into the axial region 35 and are pushed up to the horizontal region 36. A subsequent 5 to 10° rotation of the filter element 16 within the vessel 12 axially fixes the filter element 16 within the vessel 12. The horizontal region 36 has a stop 37 to prevent the filter element 16 from being rotated too far within the vessel. In alternative embodiments of the horizontal region 36, this area may also be inclined.

Figure 6:
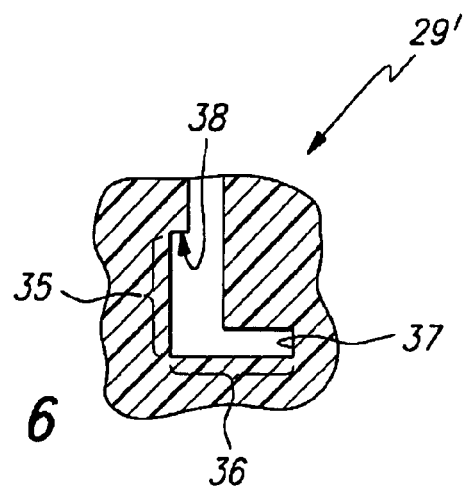
FIG. 6 is a depiction of an alternative embodiment of the guide.

FIG. 6 illustrates an alternative embodiment of the element guide 29 to that shown in FIG. 5. This element guide 29' has an axial region 35 and a horizontal region 36 similar to that shown in FIG. 5. The axial region 35 has a shoulder 38 disposed at a distance from the horizontal region 36. This shoulder 38 is positioned axially offset from the horizontal region 36 and in opposition to the direction of rotation in relation to the horizontal region. The axial distance between the horizontal region 36 and the shoulder 38 is approximately 20 mm. This distance must be such that when the filter element is removed it travels a sufficient axial distance so that a sufficiently large volume is freed.

The shoulder 38 serves to fix the filter element 16 within the vessel 12 when the device is opened so as to prevent the element from "getting caught" on the filter head 11. In the preassembled state of the filter element 16 inside the vessel 12, the guide projections 28 are guided in the horizontal region 36 so that the element 16 is held in axial direction. To remove it, the filter element 16 is rotated out of the horizontal region 36 until the guide projections 28 slide axially along the axial region 35 out of the vessel 12.

The shoulder 28 prevents the filter element from sliding completely out of the vessel 12 because the guide projections 38 strike the shoulder 38 and thus limit the axial path of the filter element 16 after approximately 2 cm. Instead of this tongue and groove configuration of the element guide 29, the guide projections 28 may also be formed as detent projections communicating with corresponding geometries on the vessel 12. To this end, the vessel 12 can have polygon-shaped geometries distributed over its circumference.

Figure 7:
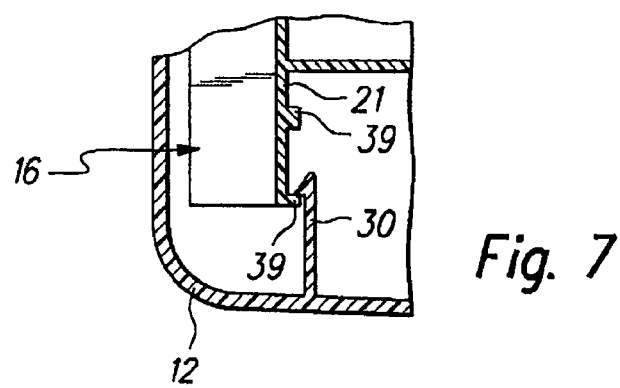
FIG. 7 is a view of yet another alternative embodiment of the guide.

FIG. 7 shows yet another alternative of the inventive fixation of the filter element 16 inside the vessel 12. In this embodiment, the support tube 21 has projections 39 which fix the position of the filter element 16 inside the vessel 12. To this end, the vessel 12 has detent hooks 30 on which the projections 39 are fixed in position.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising
   a filter head,
   a vessel having a cup-shaped chamber therein, said vessel detachably mounted on said filter head, and
   a filter element sealingly positioned inside the cup-shaped chamber of said vessel separating a filter inlet from a filter outlet so that liquid from the inlet must flow through the filter element to reach the outlet, said filter element removably installed into said cup-shaped chamber of said vessel through an open end of said cup-shaped chamber, said filter element including guide projections extending radially outwards from said filter element towards an interior wall of said cup shaped chamber of said vessel, wherein said guide projections engage said vessel to position the filter element inside the cup-shaped chamber of the vessel, wherein said filter head closes over said open top of said cup shaped chamber, thereby enclosing said filter element within said cup-shaped chamber of said vessel, and wherein the axial position of the filter element inside the vessel is shifted when the vessel is detached from the filter head wherein a spring is arranged acting between said vessel and filter element, wherein said spring acts to axially displace said filter element within said cup-shaped chamber, wherein said displacement of said filter element in said vessel creates an additional fluid storage volume in said vessel to receive fluid flowing into said vessel while said vessel is detaching from said filter head, thereby reducing the chance of fluid spillage, wherein said vessel includes at least one element guide formed onto said interior wall of said cup-shaped chamber and protruding inwardly into interior of said vessel from said interior wall, said at least one element guide including an axial region having opposing axially aligned sidewalls defining an axially aligned path along which said guide projections axially slide during insertion of said filter element into said vessel; and a horizontal or inclined region along which said guide projections axially fix said filter element in said vessel upon rotation of said filter element in said vessel;

wherein an axial position of the filter element within said vessel is fixed by engagement of said at least one element guide in which the guide projections are guideably engaged, wherein after said at least one element guide and guide projections are guideably engaged, rotation of said filter element within said vessel in a first direction mountably engages said guide projections into said horizontal or inclined region of said at least one element guide, said mountable engagement fixing an axial position of said filter element within said vessel, and wherein said at least one element guide has an axial shoulder formed as an indented wall portion formed into one of said axially aligned opposing sidewalls of said axial region, said indented wall portion having an upper horizontal wall forming said axial shoulder against which said guide projections engage to fix an axial position of said filter element inside the vessel during removal of the filter element.

2. The liquid filter as claimed in claim 1, wherein the at least one element guide has a rotational stop in the vessel mounting rotation direction to prevent over-rotation of the filter element in the vessel, said rotational stop at an end of said horizontal or inclined region opposite said axial region.

3. A liquid filter as claimed in claim 1, wherein the guide projections are uniformly distributed around the circumference of the filter element.

4. The liquid filter as claimed in claim 1, wherein said filter element is substantially contained within said vessel.

5. The liquid filter as claimed in claim 1, wherein said filter element includes a first axial end positioned facing said filter head and an opposing second axial end positioned away from said filter head, wherein at least a portion of said guide projections are arranged on said second axial end of said filter element, and wherein said mountable engagement occurs at said second axial end of said filter element.

6. A liquid filter comprising a filter head, a vessel having a cup-shaped chamber therein, said vessel detachably mounted on said filter head, and a filter element sealingly positioned inside the cup-shaped chamber of said vessel separating a filter inlet from a filter outlet so that liquid from the inlet must flow through the filter element to reach the outlet, said filter element removably installed into said cup-shaped chamber of said vessel through an open end of said cup-shaped chamber, said filter element including guide projections extending radially outwards from said filter element towards an interior wall of said cup shaped chamber of said vessel, wherein said guide projections engage said vessel to position the filter element inside the cup-shaped chamber of the vessel, wherein said filter head closes over said open to of said cup shaped chamber, thereby enclosing said filter element within said cup-shaped chamber of said vessel, wherein the axial position of the filter element inside the vessel is shifted when the vessel is detached from the filter head wherein a spring is arranged acting between said vessel and filter element, wherein said spring acts to axially displace said filter element within said cup-shaped chamber, wherein said displacement of said filter element in said vessel creates an additional fluid storage volume in said vessel to receive fluid flowing into said vessel while said vessel is detaching from said filter head, thereby reducing the chance of fluid spillage, wherein said vessel includes at least one element guide formed onto said interior wall of said cup-shaped chamber and protruding inwardly into interior of said vessel from said interior wall, said at least one element guide including an axial region along which said guide projections axially slide during insertion of said filter element into said vessel; and a horizontal or inclined region along which said guide projections axially fix said filter element in said vessel upon rotation of said filter element in said vessel;

wherein an axial position of the filter element within said vessel is fixed by engagement of said at least one element guide in which the guide projections are quideably engaged, wherein after said at least one element guide and guide projections are quideably engaged, rotation of said filter element within said vessel in a first direction mountably engages said guide projections into said horizontal or inclined region of said at least one element guide, said mountable engagement fixing an axial position of said filter element within said vessel, wherein said vessel includes said spring pushing said filter element upwardly towards said open end of said cup-shaped chamber, wherein said mountable engagement of said guide projections into said element guides resists pushing force of said spring, maintaining said fixed axial position of said filter element in said vessel, wherein detaching of said vessel from said filter head acts to disengage said mounted engagement of said guide projections into said element guides, wherein said spring acts to axially displace said filter element away from a bottom of said cup-shaped chamber upon said mountable disengagement, wherein said displacement of said filter element in said vessel creates said additional fluid storage volume.

7. The liquid filter as claimed in claim 6, wherein the at least one element guide has an axial shoulder formed as an indented wall portion formed into one of two axially aligned opposing sidewalls of said axial region, said indented wall portion having an upper horizontal wall forming said axial shoulder against which said guide projections engage to fix an axial position of said filter element inside the vessel during removal of the filter element.

8. The liquid filter as claimed in claim 6, wherein said vessel includes axially inwardly extending detent hooks, wherein said filter element includes a lower end disk having an aperture into which said detent hooks extend, wherein said detent hooks engage said lower end disk when said filter element axially displaces from said mounted engagement to a rebound position in said vessel, wherein said rebound position in said cup-shaped chamber of said vessel establishes said additional fluid storage volume, wherein at said rebound position, said detent hooks engage said lower end disk preventing further axial movement of said filter element from said vessel, assuring removal of said vessel with said filter element as a unit from said filter head.

9. The liquid filter as claimed in claim 6, wherein the at least one element guide has a rotational stop in the vessel mounting rotation direction to prevent over-rotation of the filter element in the vessel, said rotational stop at an end of said horizontal or inclined region opposite said axial region.

10. A liquid filter as claimed in claim 6, wherein the guide projections are uniformly distributed around the circumference of the filter element.

11. The liquid filter as claimed in claim 6, wherein said filter element includes a first axial end positioned facing said filter head and an opposing second axial end positioned away from said filter head, wherein at least a portion of said guide projections are arranged on said second axial end of said filter element, and wherein said mountable engagement occurs at said second axial end of said filter element.

* * * * *